(12) United States Patent
Harrison

(10) Patent No.: US 12,709,260 B2
(45) Date of Patent: Aug. 18, 2026

(54) BRAKING SYSTEM

(71) Applicant: Haldex Brake Products AB, Landskrona (SE)

(72) Inventor: Dudley Harrison, Lindley (GB)

(73) Assignee: Haldex Aktiebolag, Landskrona (SE)

( * ) Notice: Subject to any disclaimer, the term of this patent is extended or adjusted under 35 U.S.C. 154(b) by 548 days.

(21) Appl. No.: 18/252,174

(22) PCT Filed: Nov. 9, 2021

(86) PCT No.: PCT/EP2021/081040
§ 371 (c)(1),
(2) Date: May 8, 2023

(87) PCT Pub. No.: WO2022/096735
PCT Pub. Date: May 12, 2022

(65) Prior Publication Data
US 2024/0051510 A1 Feb. 15, 2024

(30) Foreign Application Priority Data
Nov. 9, 2020 (GB) ..................................... 2017665

(51) Int. Cl.
*B60T 17/22* (2006.01)
*B60Q 9/00* (2006.01)
*B60T 8/1755* (2006.01)

(52) U.S. Cl.
CPC ................ *B60T 17/22* (2013.01); *B60Q 9/00* (2013.01); *B60T 8/1755* (2013.01); *B60T 2270/406* (2013.01)

(58) Field of Classification Search
CPC ........ B60T 17/22; B60T 13/683; B60T 8/176; B60T 2270/88; B60T 2270/406;
(Continued)

(56) References Cited

U.S. PATENT DOCUMENTS

2005/0137767 A1 6/2005 Goebels et al.
2008/0288148 A1 11/2008 Amato
(Continued)

FOREIGN PATENT DOCUMENTS

GB 2499438 A 8/2013

OTHER PUBLICATIONS

British Patent No. GB 2599889 to Harrison et al published on Apr. 20, 2022.*

(Continued)

*Primary Examiner* — Pamela Rodriguez
(74) *Attorney, Agent, or Firm* — Price Heneveld LLP

(57) ABSTRACT

A braking system (110, 1110) operable to assess valve operation and a method including: an electronic control unit (132), a supply line (116, 1116) for connection to a pressurised fluid supply, a control line (124, 1124) for connection to a pressure demand, a modulator valve assembly (113, 1113) for controlling fluid supplied to one or more brake actuators (112, 1112), an electrically operable valve arrangement, which has a first state and a second state, wherein in the first state, the control line (124, 1124) is connected to the modulator valve assembly (113, 1113), and in the second state, the supply line (116, 11116) is connected to the modulator valve assembly (113, 1113), and a pressure sensor (128, 1128) positioned to monitor the pressure in the control line (124, 1124), wherein the electronic control unit (132) is operable to perform a testing cycle in which the electrically operable apply valve arrangement is moved to its second state, for a predetermined test pulse duration, and wherein the electronic control unit (132) is operable to monitor a pressure sensor signal from the pressure sensor (128, 1128) after the test pulse has been applied.

22 Claims, 3 Drawing Sheets

(58) Field of Classification Search
CPC .. B60T 2270/10; B60T 17/221; B60T 8/1708; B60T 8/323; B60T 8/1755; B60Q 9/00
See application file for complete search history.

(56) References Cited

U.S. PATENT DOCUMENTS

2012/0010779 A1 1/2012 Staufer et al.
2021/0078561 A1* 3/2021 Harrison ................. B60T 8/171

OTHER PUBLICATIONS

British Patent No. GB 2600753 to Harrison published on May 11, 2022.*

* cited by examiner 1112
1112
1112
1112
1112
1112
1113
1114a'
1114
1114a
1115a
1114
1136c
1115b
1115b
1136a
1136
1115a
1128
1136b
1124
1116
1126
1130

BRAKING SYSTEM

CROSS-REFERENCE TO RELATED APPLICATIONS

This application is a U.S. national stage of International Patent Application No. PCT/EP2021/081040, filed Nov. 9, 2021, which claims the benefit of priority of Great Britain Patent Application No. 2017665.7, filed Nov. 9, 2020, each of which are hereby incorporated by reference in their entireties.

DESCRIPTION OF INVENTION

The present invention relates to braking systems for a vehicle including a trailer and towing vehicle.

Braking systems for use in vehicles and particularly heavy goods vehicles are known. Typically, a braking system includes multiple valves which connect between a source of pressurised fluid (often housed on a towing vehicle) and one or more braking actuators. The system includes pneumatic valves, electrically operable valves, all of which must operate for the system to work as expected.

Embodiments of the invention seek to ameliorate one or more problems with the prior art.

According to a first aspect of the invention we provide, a braking system operable to assess valve operation including: an electronic control unit, a supply line for connection to a pressurised fluid supply, a control line for connection to a pressure demand, a modulator valve assembly for controlling fluid supplied to one or more brake actuators, an electrically operable valve arrangement, which has a first state and a second state, wherein in the first state, the control line is connected to the modulator valve assembly, and in the second state, the supply line is connected to the modulator valve assembly, and a pressure sensor positioned to monitor the pressure in the control line, wherein the electronic control unit is operable to perform a testing cycle in which the electrically operable valve arrangement is moved to its second state, for a predetermined test pulse duration, and wherein the electronic control unit is operable to monitor a pressure sensor signal from the pressure sensor after the test pulse has been applied.

According to a second aspect of the invention, we provide a method of assessing the operation of a valve in a braking system, the braking system including: an electronic control unit, a supply line for connection to a pressurised fluid supply, a control line for connection to a pressure demand, a modulator valve assembly for controlling fluid supplied to one or more brake actuators, an electrically operable valve arrangement, which has a first state and a second state, wherein in the first state, the control line is connected to the modulator valve assembly, and in the second state, the supply line is connected to the modulator valve assembly, and a pressure sensor positioned to monitor the pressure in the control line, wherein the method includes a test cycle which includes the steps of: applying a test pulse to the electrically operable valve arrangement, such that it is moved to its second state, for a predetermined test pulse duration, monitoring a pressure sensor signal from the pressure sensor after the test pulse has been applied.

Further optional features of the invention are defined in the appended claims.

Features of the system are described below with reference to the accompanying figures, or which:

Embodiments of the invention relate to operation of a braking system for use in a vehicle of the type including a towing vehicle and a trailer.

Figure 1:
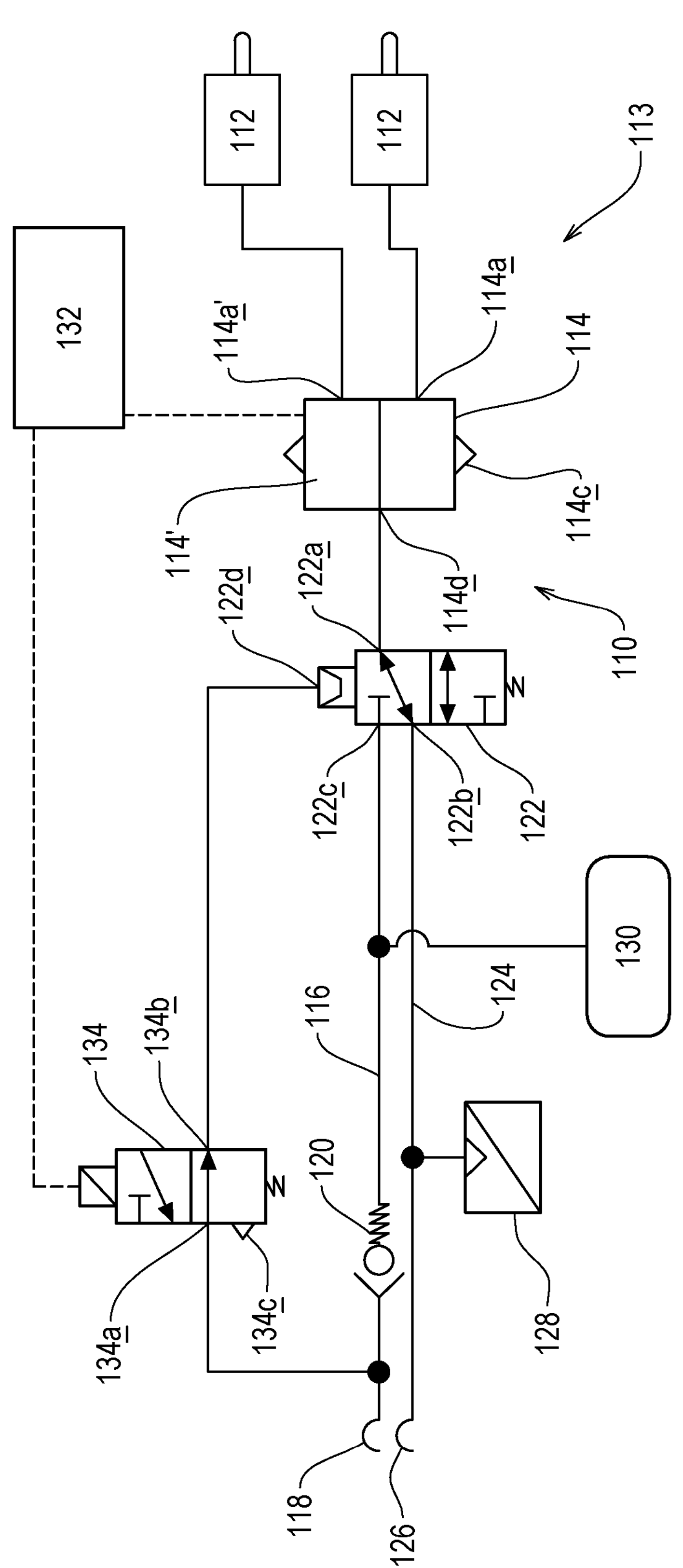
FIG. 1 is an example braking system.
Figure 2:
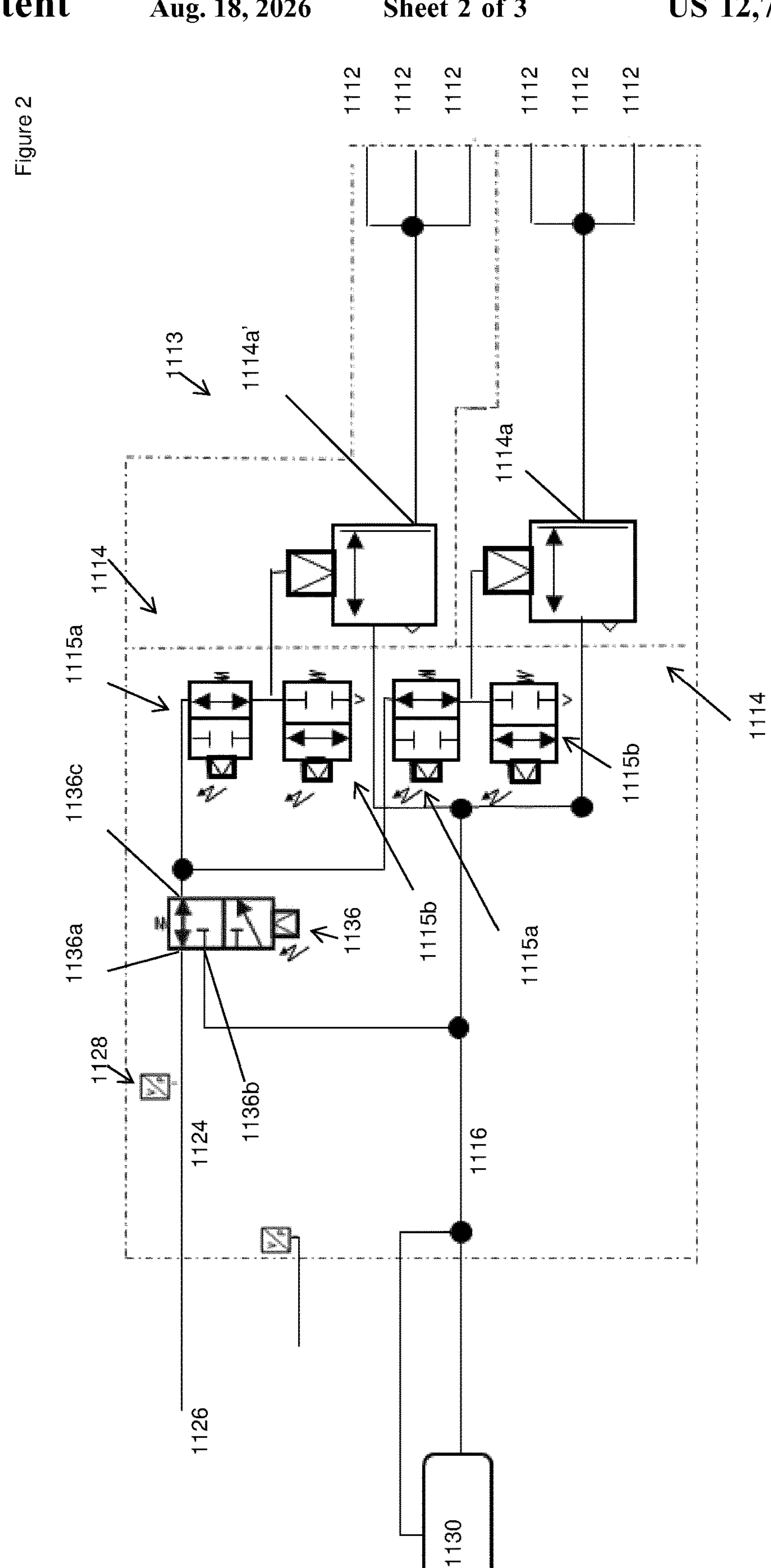
FIG. 2 is an example of another braking system.

The vehicle 10 may have an electronic braking system (EBS) which includes anti-lock braking functionality (a general system of which is illustrated in FIG. 2) or the vehicle may have an anti-lock braking system (ABS) with no EBS (an example of which is illustrated in FIG. 1).

The features of the system illustrated in FIG. 1 are described first. In this example, the trailer braking system 110 has at least one service brake actuator 112, a modulator valve assembly 113, a supply line 116, a supply connector 118, a non-return valve 120, a pneumatic valve (known as an emergency apply valve 122), a control line 124 and an electronic control unit (ECU) 132. The trailer braking system 110 also has a pressure sensor 128. The trailer braking system 110 may also include a pressurised fluid reservoir 130. Further details of the general infrastructure of the trailer braking system 110 are discussed below.

The service brake actuator 112 is operable to apply a braking force to a wheel. Further service brake actuators 112 may be provided to apply a braking force to other wheels on the same side of the vehicle and/or on an opposing side of the vehicle (for example, two service brake actuators 112 are illustrated in FIG. 1, which may be on the same side or opposing sides of the vehicle).

The service brake actuator 112 is connected to a delivery port **114*a*, 114*a*' of a braking control valve assembly, which in this example, is an anti-lock braking system (ABS) modulator valve assembly 113. In the illustrated example, the ABS modulator valve assembly 113 includes two modulators 114, 114'. The ABS modulator valve assembly 113 includes two delivery ports 114*a*, 114*a*', an exhaust port 114*c* which is connected to a low pressure region (typically atmosphere), and a control port 114*d***.

In this example, both modulators 114, 114' are operable to move between a build position, a hold position and an exhaust position (and may be formed by respective relay valves). In the build position, the respective delivery port **114*a*, 114*a*' is connected to a supply of pressurised fluid whilst the exhaust port 114*c* is closed. In the hold position, the delivery ports 114*a*, 114*a*', the exhaust port 114*c*, and the control port 114*d* are closed. In the exhaust position, the delivery port 114*a*, 114*a*' is connected to the exhaust port 114*c***.

In embodiments, each modulator 114, 114' has a control chamber which is connected to the control port **114*d*, and an electrically operable dump valve and hold valve. The modulator 114, 114' is configured such that, when there is no supply of electrical current to either the dump valve or the hold valve, the supply of pressurised fluid to the control chamber causes the modulator 114, 114' to move to the build position until the pressure at the delivery port 114*a*, 114*a*' is balanced with the pressure in the control chamber, at which point the modulator 114, 114' moves to the hold position. In other words, the pressure supplied to the brake actuator 112 is determined by the pressure at the control port 114*d***.

In some embodiments, the modulator 114, 114' is configured to move to the hold position when there is supply of electrical current to the hold valve but not to the dump valve, and to move to the exhaust position when there is supply of electrical current to the dump valve and to the hold valve. It should be appreciated that the modulators 114, 114' could equally be configured to adopt the exhaust position when there is supply of electrical current to the dump valve but not the hold valve.

It should be appreciated that the modulator details described above are for example only. Various configurations of modulator are suitable for use in ABS braking systems.

In some embodiments, when either of the modulators 114, 114' is in the build position, and when there is a fluid pressure at the control port 114*d*, pressurised fluid is transmitted to the respective service brake actuator 112. In more detail, the fluid enters a working chamber in the service brake actuator 112 and the service brake actuator 112 is configured to respond to this by actuating a brake to apply a braking force to its respective wheel.

When either of the modulators 114, 114' is in the exhaust position, pressurised fluid is exhausted from the respective service brake actuator 112. In more detail, the fluid is exhausted from the working chamber in the service brake actuator 112 and the service brake actuator 112 is configured to respond to this by releasing the braking force.

When either of the modulators 114, 114' are in the hold position, fluid pressure in the respective service brake actuator 112 is maintained. Thus, any braking force applied by the actuator 112 is held at a substantially constant level.

The emergency apply valve 122 which includes an outlet 122*a*, a first inlet 122*b*, a second inlet 122*c*, and a control port 122*d*. The outlet 122*a* is connected to control port 114*d* of the modulator valve assembly 113. In this example, the first inlet 122*b* is connected to a control line 124, the second inlet 122*c* and the control port 122*d* are connected to a supply line 116.

In embodiments, the emergency apply valve 122 is a two position valve and is movable between a first position and a second position. In the first position (illustrated in FIG. 1), the first inlet 122*b* is connected to the outlet 122*a* whilst the second inlet 122*c* is closed. In the second position, the first inlet 122*b* is closed whilst the second inlet 122*c* is connected to the outlet 122*a*.

In embodiments, the emergency apply valve 122 is provided with resilient biasing element (for example, a spring) which urges the emergency apply valve 122 to the second position. The emergency apply valve 122 moves to the first position when the fluid pressure at the control port 122*d* is sufficient to overcome the biasing force of the biasing element.

In the present example, the supply line 116 is, in use, connected to a source of pressurised fluid (typically, compressed air). When the trailer is pulled by a towing vehicle the source of pressurised fluid is typically provided on the towing vehicle, so the supply line 116 extends to a pneumatic or hydraulic supply connector 118 which is adapted, in use, to be connected to the source of pressurised fluid via a corresponding connector on the towing vehicle.

In some embodiments, a non-return (or one-way) valve 120 is provided in the supply line 116. The non-return valve 120 permits flow of fluid along the supply line 116 to the emergency apply valve 122 whilst preventing (or at least inhibiting) flow of pressurised fluid in the opposite direction from the emergency apply valve 122 to the supply connector 118.

In some embodiments, the control port 122*d* of the emergency apply valve 122 is connected to the supply line 116 upstream of the non-return valve 120. Therefore, the non-return valve 120 is located in the supply line 116 between the emergency apply valve 122 and the connection to the control port 122*d*.

In some examples, the control line 124 is connected to a source of a pressurised fluid braking demand signal. When the trailer is pulled by a towing vehicle the pressurised fluid braking demand signal typically originates on the towing vehicle and is typically generated by a driver operating a foot pedal provided in the towing vehicle. In this example, the control line 124 extends to a pneumatic or hydraulic control connector 126. The control connector 126 is adapted, in use, to be connected to the source of pressurised fluid braking demand signal via a corresponding connector on the towing vehicle.

In some embodiments, the brake system 110 includes an electrically operated apply valve (also known as an "electrically operated brake apply valve" or "brake apply valve") 134. In this example, the brake apply valve 134 is provided in the line between the control port 122*d* of the emergency apply valve 122 and the supply line 116.

The brake apply valve 134 has an inlet 134*a*, an outlet 134*b* and an exhaust port 134*c*. The inlet 134*a* may be connected to the supply line 116. The outlet 134*b* may be connected to the control port 122*d* of the emergency apply valve 122. The exhaust port 134*c* may vent to a low pressure region (e.g. atmosphere).

In some embodiments, the brake apply valve 134 is movable between a first position (illustrated in FIG. 1) and a second positon. In the first position, the inlet 134*a* is connected to the outlet 134*b*. In the second position, the inlet 134*a* is closed and the outlet 134*b* is connected to the exhaust port 134*c*. In the present example, the brake apply valve 134 is provided with a resilient biasing element (e.g., a spring) which urges the valve 134 towards and into the first position. In some embodiments, the brake apply valve 134 includes an electrically operable actuator (for example, a solenoid or piezoelectric element) which, when supplied with electrical power, causes the brake apply valve 134 to move against the biasing element towards and into the second position.

In some embodiments, the electronic braking control unit (ECU) 132 controls operation of the electrically operable valves in the modulator valve assembly 113. Advantageously, the brake apply valve 134 may be electrically connected to the braking ECU 132, so that the braking ECU 132 also controls the supply of electrical power to the electrical actuator of the brake apply valve 134.

In some embodiments, a wheel speed sensor (not shown) is provided to monitor the speed of a wheel (it should be appreciated that more than one speed sensor could be employed to monitor the speed of more than one wheel of the vehicle). In some embodiments, anti-lock braking algorithms are employed to detect locking of the wheel. If wheel lock is detected, the ECU 132 controls the electrically operable valves associated with one or both modulators 114, 114' so that it/they moves to either the hold position or the exhaust position in accordance with standard ABS control procedures. For example, the electrical power may be momentarily supplied to one or both of the dump valves to release the applied brake pressure, and/or electrical power supplied to one or both of the hold valves to hold the applied brake pressure.

It should be appreciated that, that by having two modulators 114, 114', independent ABS control of the braking force applied by multiple service brake actuators 112 is possible. The modulator valve assembly 113 could include only one modulator, but independent control of the braking force applied by each brake actuator 112 would not be possible, and any ABS intervention would be applied equally to all connected wheels.

In some embodiments, the trailer braking system 110 includes a pressurised fluid reservoir 130 (i.e. a fluid reservoir on the trailer), which may be connected to the supply line 116 downstream of the non-return valve 120.

The components of the braking system 1110 illustrated in FIG. 2 will now be discussed. Where components are the same as those discussed in relation to the braking system 110 illustrated in FIG. 1, the same reference numeral is used with a prefix of "1".

The braking system 1110 includes at least one service brake actuator 1112, a modulator valve assembly 1113, a supply line 1116, a control line 1124 and an ECU. In the illustrated example, the trailer braking system 1110 also includes a pressurised fluid reservoir 1130.

The trailer braking system 1110 also has a pressure sensor 1128. Further details of the general infrastructure of the trailer braking system 1110 are discussed below. It should be appreciated that the features and functionality of the system described in relation to FIG. 1 mostly also apply to the description below.

As discussed above, the service brake actuator 1112 is operable to apply a braking force to a wheel. In the system illustrated in FIG. 2, six individual service brake actuators 1112 are shown—three are located on one side of the trailer and three on the opposing side.

The modulator valve assembly 1113 includes two modulators 1114. Each of which has a delivery port **1114*a*, which connects to the service brake actuators 1112. In some embodiments (for example, the system illustrated in FIG. 2), the delivery port is connected to a splitting device, so that a single delivery port 1114 can be connected to multiple service brake actuators 1112**.

In some embodiments, each modulator valve assembly 1113 includes first and second electrically operated valves **1115*a*, 1115*b*, which operate in combination to control a relay valve and provide three modulator "conditions". In this example, the valves move to provide a build position (increasing control pressure to increase the pressure being delivered by the modulator valve assembly 1113), a hold position (a constant pressure to be held constant by the modulator valve assembly 1113) and an exhaust position (to release pressure from the modulator valve assembly 1113). Each condition has the same functionality in relation to the brake actuators as discussed above in relation to FIG. 1**.

The modulator valve assembly 1113 is configured such that, when there is no supply of electrical current to either the second valve **1115*b* (known as the dump valve) or the first valve 1115*a* (known as the hold valve), the supply of pressurised fluid provides the build position. In some embodiments, the modulator valve assembly 1113 is configured to move to the hold position when there is supply of electrical current to the hold valve 1115*a* but not to the dump valve 1115*b*, and to move to the exhaust position when there is supply of electrical current to the dump valve 1115*b* and to the hold valve 1115*a***. It should be appreciated that the modulator details described above are for example only. Various configurations of modulator are suitable for use in ABS braking systems.

The supply line 1116 is, in use, is connected to a source of pressurised fluid (typically, compressed air)—in this example, the connection to the supply is through the pressurised fluid reservoir 1130. While the supply line 1116 is connected to the source of pressurised fluid on the towing vehicle, the pressurised fluid reservoir 1130 is continuously filled to ensure the volume is kept full.

As discussed above, the control line 1124 is connected to a source of a pressurised fluid braking demand signal.

The brake system 1110 includes an electrical apply valve 1136. In this example, the apply valve 1136 is provided in the between the modulator valve assembly 1113 (downstream) and the control line 1124/supply line 1116. It should be appreciated that the apply valve 1136 has the same general pneumatic connections as the emergency apply valve 122 described in relation to FIG. 1. However, the apply valve 1136 is additionally directly operable by electrical signal coming from the ECU whereas the emergency apply valve 122 in FIG. 1 is controllable by the brake apply valve 134.

In some embodiments, the apply valve 1136 includes a first and second inlet **1136*a*, 1136*b* and an outlet 1136*c*. The apply valve 1136 is movable between a first position (illustrated in FIG. 2) and a second positon. In the first position, the first inlet 1136*a* is connected to the outlet 1136*c* (and the second inlet 1136*b* is closed). In the second position, the second inlet 1136*b* is connected to the outlet 1136*c* (and the first inlet 1136*a* is closed). In some embodiments, this results in the control line 1124 being connected to the modulator valve assembly 1113 when the apply valve 1136** is in its first position.

The supply line 1116 is connected to the modulator valve assembly 1113 when the apply valve 1136 is in its second position.

In the present example, the apply valve 1136 is provided with a resilient biasing element (e.g., a spring) which urges the valve 1136 towards and into the first position. The apply valve 1136 includes an electrically operable actuator (for example, a solenoid or piezoelectric element) which, when supplied with electrical power, causes the apply valve 1136 to move against the biasing element towards and into the second position.

Both of the example braking systems 110, 1110 illustrated operate in a similar manner to bring about service braking at the service brake actuators 112, 1112. When driver demanded service braking is required, the driver applies pressure to a brake pedal or similar. The brake pedal operates to provide pressure in the control line 124, 1124 which is transferred through the system to the modulator valve assembly 113, 1113 and results in pressure being delivered from the delivery port **114*a*, 114*a'*, 1114*a*, 1114*a'***.

In addition to the driver demanded braking pressure, the system 110, 1110 can also operate to implement service braking itself if it is deemed appropriate (for example, if the vehicle is in danger of rolling because it is traveling too fast around a corner and/or a low friction environment is identified and braking is required to ensure the safety of the vehicle). The two systems described above operate in different ways to bring this autonomous service braking into effect. In embodiments like the system 110 in FIG. 1, the ECU 132 signals to the brake apply valve 134 to move the brake apply valve 134 to its second position. This causes the control pressure at the emergency apply valve 122 to drop and the emergency apply valve 122 moves to its first position (due to the biasing) and connects the supply line 116 (which is always pressurised) to the modulator valve assembly 113. In embodiments like the system 1110 in FIG. 2, the ECU signals to the apply valve 1136 to move to its second position (an energised movement acting against the biasing). In the second position, the apply valve 1136 connects the supply line 1116 (like above, is continuously pressurised) to the modulator valve assembly 1113, so that pressure can be built and delivered to the service brake actuators 1112.

It should be appreciated that when the trailer is disconnected from a towing vehicle, the trailer braking system 110, 1110 is also disconnected and usually becomes unpowered (i.e. shuts down apart from a limited number of operations possible). Thus, it is important that the trailer braking system 110, 1110 is able to connect to towing vehicles/power up many times and assess that the system 110, 1110 is ready for use. Thus, the ECU may be configured to perform one or more processes. In embodiments, the ECU may be configured to perform these processes when it detects connection to a fluid source and/or power source. In other words, when the ECU detects one or more connections to the towing vehicle it implements one or more "start-up" routines.

It should be appreciated that when the trailer is disconnected from a towing vehicle, the trailer braking system 110, 1110 is also disconnected and usually becomes unpowered. In other words, the trailer braking system 110, 1110 may shut down completely or may have limited power (e.g. from a battery or other small capacity power source) to be able to perform only a limited subset of normal operational processes. Therefore, each time the braking system 110, 1110 is connected/reconnected the ECU and other powered parts of the braking system 110, 1110 are booted up/started. In order to make sure the braking system will work optimally, the braking system 110, 1110 must assess one or more characteristics of the system either before the vehicle pulls away (i.e. the vehicle is stationary) or in an early part of a journey (e.g. just after the vehicle has pulled away from a starting point).

One of the characteristics that the system 110, 1110 assesses is aspects relating to the valves and/or pipes that are present in the system. The presently described method relates to assessing the operation of a valve.

In the method, an electrically operable valve arrangement is formed. This may include one or more valves already described above. For example, in relation to the embodiments relating to FIG. 1, the electrically operated valve arrangement may include both the brake apply valve 134 and the pneumatic valve (emergency apply valve 122). In another example (like embodiments relating to FIG. 2), the electrically operable valve arrangement may include a single apply valve (in this specific case, the brake apply valve 1136). Thus, the electrically operable valve arrangement has a first state and a second state, wherein in the first state, the control line is connected to the modulator valve assembly, and in the second state, the supply line is connected to the modulator valve assembly.

Figure 3:
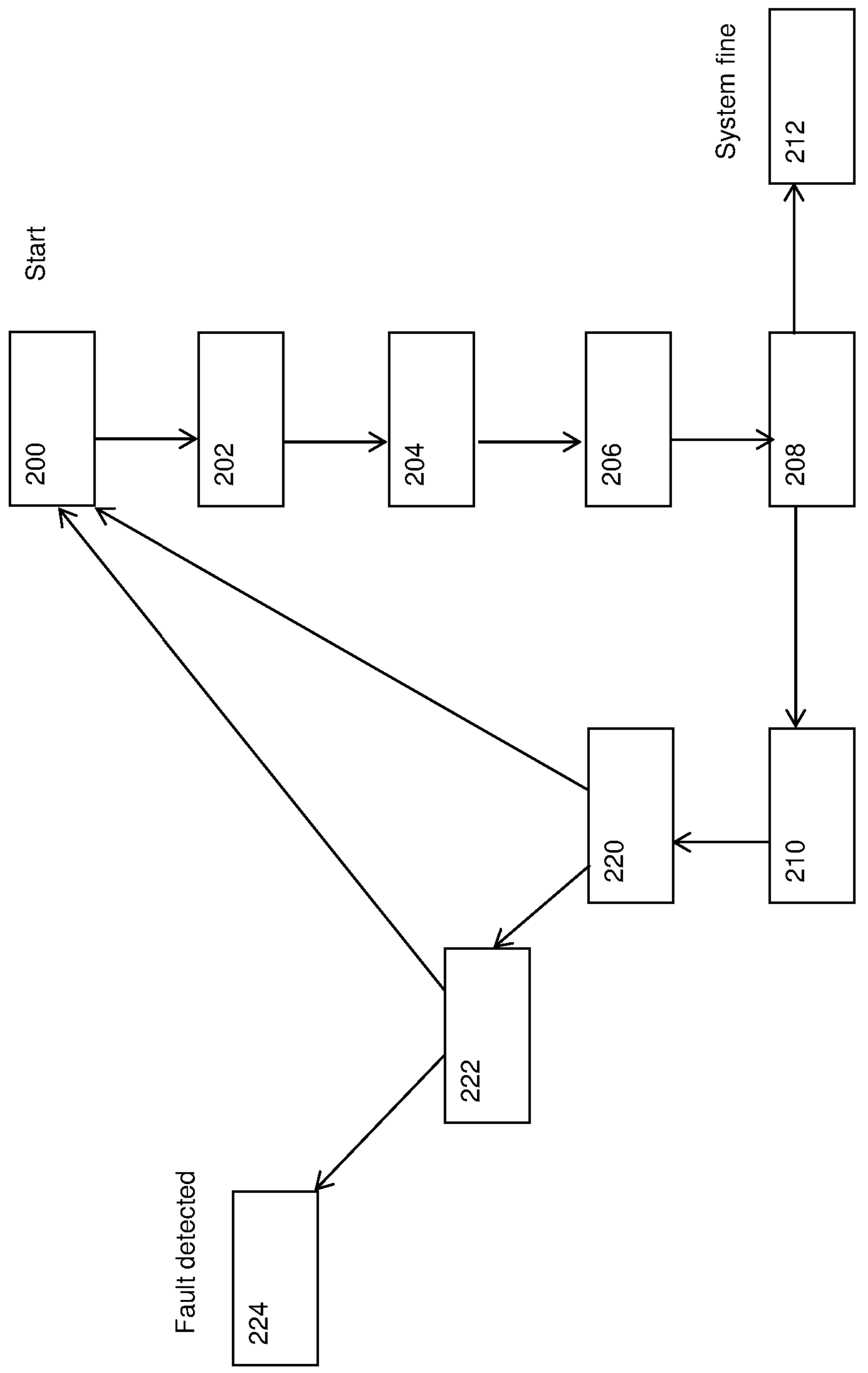
FIG. 3 is a flow diagram of the steps of a method of assessing valve operation.

The electronic control unit is operable to perform a testing cycle in which the electrically operable valve arrangement is moved to its second state, for a predetermined test pulse duration (200, 202, 204 in FIG. 3) (for example, the test pulse duration may be approximately 70 ms), and wherein the electronic control unit is operable to monitor a pressure sensor signal from the pressure sensor after the test pulse has been applied (206 in FIG. 3).

In embodiments, the ECU 132 initiating a test pulse of the brake apply valve 134. The test pulse is a signal to the brake apply valve 134 to move from the first position to the second position and lasts for a predetermined duration. Once the pulse signal is released, the brake apply valve 134 moves back to its first position. This action results in loss of pressure to the control port **122*d* of the emergency apply valve 122—that valve to moves to its second position which connects the supply line 116 to the outlet 122*a***.

In embodiments, ECU 132 moves the modulators 114, 114' to the hold position, so that pressure permitted through the emergency apply valve 122 as a result of the test pulse does not result in braking pressure at the brake actuators 112. The hold position may be implemented and maintained for the entirety of the testing cycle (and, preferably, the hold state is maintained for the duration of multiple (more preferably, all) testing cycles). It should be appreciated that in between testing cycles, the hold state may not be maintained/altered depending on whether the vehicle is moving/actual braking is required—in which case, the ECU may be operable to maintain the hold state for the testing cycle (and other tests) only while it does not interfere with proper and safe operation of the braking system.

In embodiments, once the test pulse ends, the brake apply valve 134 resets to its default (biased) position, which allows pressure to the control port of the emergency apply valve 122. Thus, the emergency apply valve 122 moves back to its first positon, in which the control line 124 connects to its outlet **122*a***.

The ECU 132 waits to receive a signal from the pressure sensor 128 in the control line 124. The pressure developed (or, in other words, the fluid held) between the electrically operable valve arrangement (may be the pneumatic valve 122 or the apply valve 1136, for example) and the modulator valve assembly 113, 1113 flows back along the newly opened connection to the control line 124. The pressure sensor 128 detects the back flow. In other words, this method relies on the fluid/air that fills the space (the pipe) between the valve arrangement and the modulator valve assembly 113 (fluid that flows "downstream" during the test pulse) flowing upstream (i.e. towards the pressure sensor 128 and/or towards the connector between the control line 124 and the towing vehicle). It should be appreciated that this air flow is applicable to all embodiments described in the description.

The system can be operated in this way because the control line 124 is not pressurised unless there is braking demand from the driver.

If the ECU 132 receives the signal from the pressure sensor 128, this confirms that the electrically operable valve arrangement component(s) (for example, the brake apply valve 134 and emergency apply valve 122 or apply valve 1136) are working as intended. In embodiments, the duration of the detected pressure also provides an indication of the amount of fluid flowing back through the control line 124 and, thus, may be used to calculate the volume of the pipe between the emergency apply valve 122 and the modulators 114, 114'. The expected pipe volume is between about 50 cc and 200 cc.

This knowledge of the volume may be compared with previous knowledge to confirm acceptable conditions. The ECU is operable to alter one or more other procedures in based on the pressure sensor signal. For example, the ECU 132 may alter the duration of test pulses used in an ABS stability routine on the basis of the detected volume of the pipe. For example, test pulses and the length of those test pulses are used frequently in stability control routines to assess whether a vehicle is stable on a road surface (braking test pulses are applied to one or more wheels to assess the current traction of those one or more wheels on a surface). The ECU 132 having up to date knowledge of the volumes in the pipes allows the ECU 132 to alter other test pulse durations to build the desired pressure for a wheel traction assessment.

In embodiments, the ECU 132 waits a predetermined time period (a "rest period"), after the test pulse has been completed, to receive the pressure sensor 128 signal. In some embodiments, the rest period may be around 250 ms.

The length of the rest period may be dependent on multiple different aspects of the system. In embodiments (such as the example illustrated in FIG. 1), the brake apply valve 134 may not be integral with the modulator valve assembly 113 (i.e. within the same valve housing) which means that the distance between the components (e.g. the valves 134, 122 and modulator valve assembly 113 and the pressure sensor 128) and the volume in the pipes between the components may be relatively high (compared with an integrated system). For example, the pipe between the brake apply valve 134/pressure sensor 128 and the pneumatic valve 122 may be around 6 mm in diameter and of the order of 2.5 m long. Further, the emergency apply valve/pneumatic valve 122 may have a higher flow capacity and the orifice diameter may be comparable to the pipe diameter (e.g. around 6 mm).

If the pressure sensor 128 sends a signal to the ECU 132 indicating there is pressure sensed in the control line 124, the ECU 132 assigns a "pass" to the testing cycle and the ECU 132 may move on to other start up routines or allow normal vehicle operation. However, if the ECU 132 does not receive a signal from the pressure sensor 128 or the ECU 132 receives an inadequate signal, a "fail" is assigned to the testing cycle. The ECU 132 may be configured to rerun the testing cycle one or more additional times. In other words, the ECU 132 may be operable to perform multiple consecutive testing cycles (if no or an inadequate pressure sensor signal is received).

In some embodiments, the ECU 132 may rerun the testing cycle up to five times. Each subsequent testing cycle may be conducted with increased test pulse duration. For example, the first testing cycle has a test pulse duration of 70 ms and each subsequent test cycle that occurs increases the test pulse duration by 30 ms (i.e. the second test pulse duration is 100 ms, the third is 130 ms, the fourth is 160 ms and the fifth is 190 ms). Thus, more pressure is permitted to build with each subsequent test cycle and it is more likely that the pressure will be sufficient to reach the pressure sensor.

With increased test pulse duration, more fluid should flow through the pneumatic valve 122 to the pipe upstream of the modulator valve assembly 113. This allows for a better estimation of the pipe volume. In embodiments, the duration of an elevated pressure signal is used to indicate the volume of the pipe. In other words, if the pressure is above a predetermined threshold then this is considered to be the fluid flowing back along the pipe and the length of time the pressure is above that threshold is used as a volume estimation.

In embodiments, the magnitude or level of pressure recorded is not used to estimate the volume, only the duration of the pressure signal above the threshold.

The rest period may stay consistent for all of the testing cycles or it may increase in step with the increase in test pulse duration.

In some embodiments, the ECU 132 assigns a "pass" or "fail" to each testing cycle. A "pass" indicates that the ECU 132 has received an adequate sensed pressure, whereas a "fail" indicates that no (or inadequate) pressure has been sensed in the control line 124. If a "pass" is assigned, the ECU 132 may not continue with any further testing cycles (as mentioned above). If a "fail" is assigned, the ECU 132 may continue with the remainder of the testing cycles permitted. The ECU 132 may be configured to pause for a set amount of time (e.g. around 2 minutes) after assigning "fail" to all of the testing cycles run in a first set. The ECU 132 may then rerun the testing cycles after that pause period is over. In some embodiments, the ECU 132 is permitted to run up to three separate sets of testing cycles (i.e. 15 separate cycles with 5 cycles per set).

The pause period is provided to account for the situation where the pressurised fluid reservoir 130 may not be full. If there is less air in the reservoir 130 than anticipated then the signals coming from the pressure sensor 128 may be inaccurate due to assumptions about the volume of fluid coming from the reservoir 130 during testing not being accurate. This may lead to assigning a "fail" to a testing cycle incorrectly or a "pass" is assigned but a misleading evaluation of the pipe volume is found.

In some embodiments, if the ECU 132 has "fail" assigned to all the testing cycles (or more than an acceptable/predetermined lower threshold), across the separate sets of testing cycles, the ECU 132 generates a fault code/alarm/visual indicator of the fault to the towing vehicle.

For a braking system 1110 more similar to that illustrated in FIG. 2 (i.e. a system with an EBS), an alternative method of testing may be more appropriate. In such a system 1110, the volume in the pipe between the apply valve 1136 and the modulators 1114 is fixed, so there is little or no need to calculate the pipe volume. The main advantage of using this method in a braking system 1110 that is an electronic braking system is that it will indicate whether the apply valve 1136 is operating. This method is particularly useful if the EBS is running in a basic mode which implements only ABS with roll-over/stability control and not a full EBS system (which often includes one or more delivery pressure sensors to confirm pressure is delivered (and, thus, the apply valve operates), as desired).

In an analogous manner to the method outlined above, the ECU initiates a test pulse of the electrically operable valve arrangement, which in this example includes the apply valve 1136. The apply valve 1136 moves to its energised (second) position, which connects the supply line 1116 to the outlet 1136*c*. Again, the modulators 1114 are maintained in the hold position to prevent braking pressure being transferred to the brake actuators 1112. It should be appreciated that the same process of implementation and maintenance of the hold state as described above in relation to FIG. 1 may also be applicable to embodiments such as those illustrated in FIG. 2.

Once the test pulse is complete, the apply valve 1136 moves back to its default (first) position, in which the control line 1124 connects to the outlet 1136*c*. The fluid that has accumulated in the pipe between the modulator 1114 and the apply valve 1136 is then permitted to back flow along the control line 1124. The pressure sensor 1128 sends a signal of the pressure to the ECU, which indicates that the apply valve 1136 has and is operating as it should be (i.e. changing states when an electric signal is sent and defaulting back to the first position when the electric signal is removed).

In some embodiments (for example, those which use an EBS), a different test pulse duration and rest period (in which the ECU is waiting for a signal to come from the pressure sensor 1128 after a test pulse has been applied) to that discussed above may be implemented.

The test pulse duration may still start at 70 ms and increase by 30 ms with each subsequent test cycle. However, the rest period may be shorter—for example, the rest period may be around 70 ms. The shorter rest period may be implemented because the apply valve 1136 has a fast switching speed (compared to the emergency apply valve 122 of the braking system 110 discussed above)—thus, the pressure built between the apply valve 1136 and the hold valves 1115*a*, 1115*b* flows back along the control line 1124 faster. In some embodiments (such as the example if FIG. 2), the apply valve 1136 is physically integrated with the modulator valve assembly 1113. This means the physical distance (length of the pipe) between the components of the system 1110 is shorter/smaller, so there is less volume to fill/less fluid to flow back along the pipes. In other words, the apply valve 1136 is positioned closer to the modulator valve assembly 1113 and the pressure sensor 1128 is closer to the apply valve 1136 (for example, the pressure sensor 1128 may be of the order of under 10 cm from the apply valve 1128, so the fluid has a much shorter distance to travel to be registered by the pressure sensor 1128). Further, the flow capacity of the apply valve 1136 may be low with a small orifice diameter of around 1 mm (which is relatively lower than a non-integral system—the example discussed with reference to FIG. 1). It should be appreciated that a smaller pipe/orifice diameter may result is higher rate fluid flow (when compared to a wider pipe setup). In embodiments, the pressure in the pipe has the same starting level as that of a wider pipe but there is less volume in which the same fluid flows, meaning the flow is necessarily faster.

In some embodiments, the ECU repeats the testing cycle up to 3 times with the test pulse duration increasing by 30 ms with each subsequent test cycle. If a "pass" is assigned to a testing cycle, the ECU may be satisfied that the apply valve 1136 is operating as required. Optionally, no further testing may occur in that specific vehicle journey as the apply valve 1136 is constantly (more or less) in use during normal driving of the vehicle.

If the ECU assigns a "fail" to each testing cycle (or more that a predetermined lower threshold of permitted "fails"), the ECU may pause (as discussed above and may be around 2 minutes long) and resume a second set of testing cycles. As in the example described above, the pause period is provided to account for the situation where the pressurised fluid reservoir 1130 may not be full. A "fail" may be assigned to a testing cycle incorrectly, so rerunning the testing cycle may allow that error to be overridden by a more up to date result (i.e. once the reservoir 1130 is full).

In some embodiments the maximum number of sets may be three (in this example, there are a total of 9 permitted testing cycles—three sets of three testing cycles)—the ECU may then implement the alarm/fault code/etc. to the towing vehicle to indicate there is a fault with the apply valve 1136.

An example of how the method may operate is illustrated in FIG. 3. The ECU applies the test pulse to the electrically operable valve arrangement (200). During the test pulse, the pressure is built downstream of the electrically operable valve arrangement—e.g. the pneumatic valve 122 or apply valve 1136 (202). Then the test pulse is released (204). The ECU waits for set amount of time to allow a pressure sensor signal to arrive (206). At the end of the rest period the ECU assesses whether that expected signal has arrived (208). If yes, then the testing cycle is passed and the braking system may move on to other routines or operate as normal for a vehicle journey (212).

If no, the ECU considers how many testing cycles have already been performed (210) and whether a maximum allowed has been reached (220). If the number of testing cycles is below a predetermined number (e.g. five), the ECU proceeds to the start of the testing cycle again (200). If the number of cycles has reached the maximum permitted, then a pause period is implemented (222) and then the ECU moves again to the start of a new testing cycle again (200).

Once a maximum number of sets of testing cycles has been met, a fault code is issued (224).

Representative features are set out in the following clauses, which stand alone or may be combined, in any combination, with one or more features disclosed in the text and/or drawings of the specification.

Clause 1. A method of assessing the operation of a valve in a braking system, the braking system including:

an electronic control unit, a supply line for connection to a pressurised fluid supply, a control line for connection to a pressure demand, a modulator valve assembly for controlling fluid supplied to one or more brake actuators, an electrically operable valve arrangement, which has a first state and a second state, wherein in the first state, the control line is connected to the modulator valve assembly, and in the second state, the supply line is connected to the modulator valve assembly, and a pressure sensor positioned to monitor the pressure in the control line, wherein the method includes a test cycle which includes the steps of:

applying a test pulse to the electrically operable valve arrangement, such that it is moved to its second state, for a predetermined test pulse duration, monitoring a pressure sensor signal from the pressure sensor after the test pulse has been applied.

Clause 2. A method according to clause 1 wherein the ECU waits a predetermined rest period, after the test pulse has been applied, to receive the pressure sensor signal.

Clause 3. A method according to clause 2 wherein the rest period is between about 70 ms and 250 ms.

Clause 4. A method according to any of the preceding clauses wherein the test pulse durations is around 70 ms.

Clause 5. A method according to any of the preceding clauses wherein multiple consecutive testing cycles are performed, if no or an inadequate pressure sensor signal is received.

Clause 6. A method according to clause 5 wherein up to five consecutive testing cycles are performed, optionally only if no or inadequate pressure sensor signal is received after each test cycle.

Clause 7. A method according clause 5 or 6 wherein the test pulse duration is increased with each subsequent testing cycle.

Clause 8. A method according to clause 7 wherein the test pulse duration is increased by 30 ms with each subsequent test cycle.

Clause 9. A method according to any of the preceding clauses in which the ECU waits a predetermined pause period if a maximum number of permitted testing cycles has been reached.

Clause 10. A method according to clause 9 wherein the pause period is around two minutes.

Clause 11. A method according to clauses 9 or 10 wherein the ECU performs a further set of one or more testing cycles after the pause period.

Clause 12. A method according to clause 11 wherein the ECU performs up to three sets of testing cycles.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

Although certain example embodiments of the invention have been described, the scope of the appended claims is not intended to be limited solely to these embodiments. The claims are to be construed literally, purposively, and/or to encompass equivalents.

The invention claimed is:

1. A braking system operable to assess valve operation including: an electronic control unit, a supply line for connection to a pressurised fluid supply, a control line for connection to a pressure demand, a modulator valve assembly for controlling fluid supplied to one or more brake actuators, an electrically operable valve arrangement, which has a first state and a second state, wherein in the first state, the control line is connected to the modulator valve assembly, and in the second state, the supply line is connected to the modulator valve assembly, and a pressure sensor positioned to monitor the pressure in the control line, wherein the electronic control unit is operable to perform a testing cycle in which the electrically operable valve arrangement is moved to its second state, for a predetermined test pulse duration, and wherein the electronic control unit is operable to monitor a pressure sensor signal from the pressure sensor after the test pulse has been applied.

2. A braking system according to claim 1 wherein the test pulse duration is around 70 ms.

3. A braking system according to claim 1 wherein the electronic control unit is operable to perform multiple consecutive testing cycles, if no or an inadequate pressure sensor signal is received.

4. A braking system according to claim 3 wherein the electronic control unit is operable to perform up to five consecutive testing cycles.

5. A braking system according to claim 3 wherein the electronic control unit is operable to increase the test pulse duration with each subsequent testing cycle.

6. A braking system according to claim 5 wherein the test pulse duration is increased by 30 ms with each subsequent test cycle.

7. A braking system according to claim 1 in which the electronic control unit is operable to wait for a predetermined pause period if a maximum number of permitted testing cycles has been reached.

8. A braking system according to claim 7 wherein the pause period is around two minutes.

9. A braking system according to claim 7 wherein the electronic control unit is operable to perform a further set of one or more testing cycles after the pause period.

10. A braking system according to claim 1 wherein the modulator valve assembly has a hold state in which a current pressure is held and no further fluid is permitted to enter the modulator valve assembly, a build state in which the pressure in the modulator valve assembly is permitted to increase and an exhaust state in which pressure is exhausted to atmosphere, and wherein the ECU is operable to implement the hold state for at least the test pulse duration.

11. The braking system according to claim 10, wherein the ECU is operable to implement and maintain the hold state for the duration of one or multiple or all of the testing cycles.

12. A braking system according to claim 1 wherein the electrically operable valve arrangement includes a single apply valve which has a first and a second input connected to the supply line and the control line, respectively, and an output which is connected to the modulator valve assembly, wherein in the first state the control line input is connected to the output and the second input is closed and in the second state the supply line input is connected to the output and the first input is closed.

13. A braking system according to claim 1 wherein the electrically operable valve arrangement includes an electrically operated apply valve and a pneumatic valve, the pneumatic valve having a control port, which is controlled by the electrically operated apply valve, a first inlet connected to the control line, a second inlet connected to the supply line, and an outlet connected to the modulator valve assembly, wherein the pneumatic valve has a first and second position, and in the first position, the control line is connected to the modulator valve assembly and the second inlet is closed, and in the second position, the supply line is connected to the modulator valve assembly and the first inlet is closed.

14. A braking system according to claim 13 wherein the electrically operated apply valve has an inlet, connected to the supply line, an outlet, connected to the control port of the pneumatic valve, and an exhaust and is operated by electrical signal from a first biased position in which the inlet is connected to the outlet to a second position in which the inlet is closed and the outlet connects to the exhaust.

15. A braking system according to claim 14 wherein the pneumatic valve is connected to the modulator valve assembly via a pipe.

16. A braking system according to claim 13 wherein the electronic control unit is operable to alter one or more other procedures based on the pressure sensor signal.

17. A braking system according to claim 16 wherein the electronic control unit alters the duration of test pulses used in an ABS stability routine on the basis of a detected volume of the pipe.

18. A braking system according to claim 1 wherein the electronic control unit is operable to send a fault code to a towing vehicle.

19. The braking system of claim 1, a towing vehicle driver interface to alert the driver of a fault condition.

20. A braking system operable to assess valve operation Including: an electronic control unit, a supply line for connection to a pressurised fluid supply, a control line for connection to a pressure demand, a modulator valve assembly for controlling fluid supplied to one or more brake actuators, an electrically operable valve arrangement, which has a first state and a second state wherein in the first state, the control line is connected to the modulator valve assembly, and in the second state, the supply line is connected to the modulator valve assembly, and a pressure sensor positioned to monitor the pressure in the control line, wherein the electronic control unit is operable to perform a testing cycle in which the electrically operable valve arrangement is moved to its second state, for a predetermined test pulse duration, and wherein the electronic control unit is operable to monitor a pressure sensor signal from the pressure sensor after the test pulse has been applied; and wherein the electronic control unit is operable to wait a predetermined rest period, after the test pulse has been applied, to receive the pressure sensor signal.

21. A braking system according to claim 20 wherein the rest period is between about 70 ms and 250 ms.

22. A method of assessing the operation of a valve in a braking system, the braking system including:

an electronic control unit, a supply line for connection to a pressurised fluid supply, a control line for connection to a pressure demand, a modulator valve assembly for controlling fluid supplied to one or more brake actuators, an electrically operable valve arrangement, which has a first state and a second state, wherein in the first state, the control line is connected to the modulator valve assembly, and in the second state, the supply line is connected to the modulator valve assembly, and a pressure sensor positioned to monitor the pressure in the control line, wherein the method includes a test cycle which includes the steps of:

applying a test pulse to the electrically operable valve arrangement, such that it is moved to its second state, for a predetermined test pulse duration, monitoring a pressure sensor signal from the pressure sensor after the test pulse has been applied.

* * * * *